Patented Oct. 17, 1939

2,176,592

UNITED STATES PATENT OFFICE 2,176,592

COMPOSITION OF MATTER FOR PRECIPITATING TANNINS

Robert R. Means and Harry E. Lederer, Osawatomie, Kans.

No Drawing. Application February 24, 1937, Serial No. 127,407

3 Claims. (Cl. 167—58)

This invention relates to a composition of matter containing gelatin and calcium hydroxide useful as a topical application for precipitating tannins present in the air.

It is thought that hay fever is caused by various tannins which are thrown off by certain plants and are present in the air as foreign substances. These tannins are strongly astringent acids and when breathed into the nostrils, contact the mucous membrane of the respiratory tract, thereby affecting said membrane to produce, or aggravate, what is commonly called hay fever.

It is the object of the present invention to produce a composition of matter suitable for use as a topical application for said mucous membrane, whereby the tannins of the air breathed into the respiratory tract will contact said topical application and be chemically changed to produce resultant products which will be substantially insoluble, should they contact the mucous membrane.

A further object of this invention is the production of a composition, comprising gelatin, a strong base, and water, suitable for precipitating tannins in the atmosphere, whereby said tannins are chemically changed to become insoluble by chemical conditions set up by the mucous membranes of the human body.

In the preparation of this composition of matter, gelatin and a strong base are mixed in water to form a liquid composition.

Gelatin is a term applied to a product of animal origin, protein-like in its nature, but of a variable composition depending on its source and method of preparation. Gelatin always acts both as a weak acid and a weak base. The strong base preferably used is calcium hydroxide; however, other strong bases such as barium hydroxide, strontium hydroxide, magnesium hydroxide, sodium hydroxide, potassium hydroxide, lithium hydroxide, etc., might be used with good effect.

Calcium hydroxide is a strong base and will react with gelatin to form water and calcium salt or salts of the acids of the gelatin. Since gelatin is of unknown and varied composition, it is impossible to accurately represent the reactions in exact terms.

In the preparation of this composition the gelatin is first dissolved in the water by the aid of heat, and then the calcium hydroxide, or some other suitable strong base, is added to form a liquid composition. It is possible to produce this composition in varying strengths from a very weak to a saturated solution.

While the most practical composition for general use for a topical application to the mucous membrane of the nasal cavities has been found to be one grain of gelatin, one-half ($\frac{1}{2}$) grain of calcium hydroxide, and one fluid ounce of water, yet any composition within the following limits will function to produce the desired effect in varying degrees: one one-hundredth ($1/100$) grain to two (2) grains of calcium hydroxide, one one-hundredth ($1/100$) grain to four hundred (400) grains of gelatin, and one (1) fluid ounce of water, preferably distilled water.

The tannins are of various origins and differ in composition so that their exact composition cannot be stated, however, they all have certain properties in common, such as rendering gelatins or gelatinates difficultly soluble in water or in the natural secretions of the mucous membrane of the nasal passages of the human body.

During certain seasons of the year, air in most localities contains many tannins which aggravate or cause what is commonly termed hay fever; an affection of the mucous membrane of the eyes, nose and respiratory tract. By applying a coating of said composition of matter to said mucous membrane, the tannins will come in contact with said coating so that they will unite with the calcium to form salts which are substantially insoluble in water or mucous membrane secretions; furthermore, there will also be a reaction between the gelatin or the calcium gelatinate or gelatinates present to form substantially insoluble compounds.

It is a well known fact that the acidity of the human body is not sufficiently high to break down the compounds formed when the tannins and the present composition are brought together.

While it is the purpose of the present invention to prepare a liquid composition of matter suitable for direct application to the respiratory membranes, however, the air to be breathed might be filtered through a screen containing said composition of matter, whereby the tannins contained therein would become ineffectual as a hay fever cause or aggregation.

Rooms may be provided with air inlets having screens or filters containing the present composition of matter, whereby the free tannins of the air are made substantially insoluble in the human respiratory tract, also masks with this composition therein might be worn by the patient.

As indicated above, many variations in proportions of the gelatin and strong base may be made without causing any material change in the general functioning of the composition to alter the form of the tannins, and it is desired to be limited only by the scope of the appended claims.

Having thus described the invention, what is claimed as new and desired to be secured by Letters Patent is:

1. A composition of matter for precipitating tannins from the air produced by intermixing approximately one-half (½) grain of calcium hydroxide, one (1) grain of gelatin, and one (1) fluid ounce of water.

2. A composition of matter for precipitating tannins from the air produced by intermixing from one one-hundredth (1/100) grain to two (2) grains of calcium hydroxide, one one-hundredth (1/100) grain to four hundred (400) grains of gelatin, and one (1) fluid ounce of water.

3. A composition of matter for use as a topical application for the nasal mucous membrane to protect said membrane from tannins in the air produced by intermixing approximately one-half (½) grain of calcium hydroxide, one (1) grain of gelatin and one (1) fluid ounce of water.

ROBERT R. MEANS.
HARRY E. LEDERER.